Patented Nov. 15, 1932

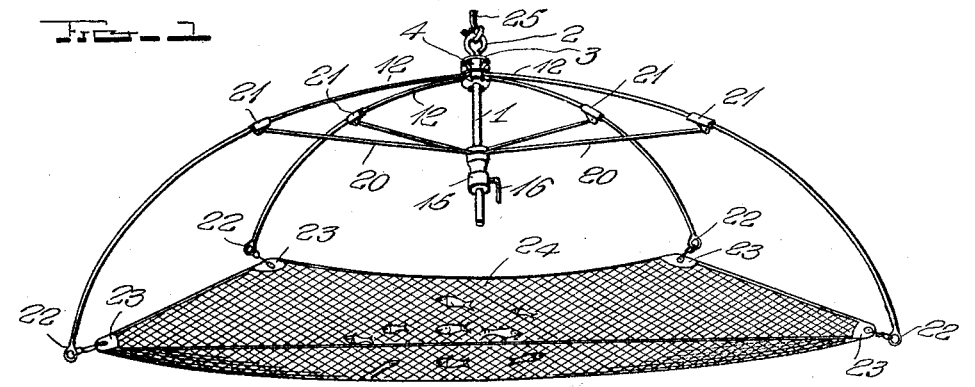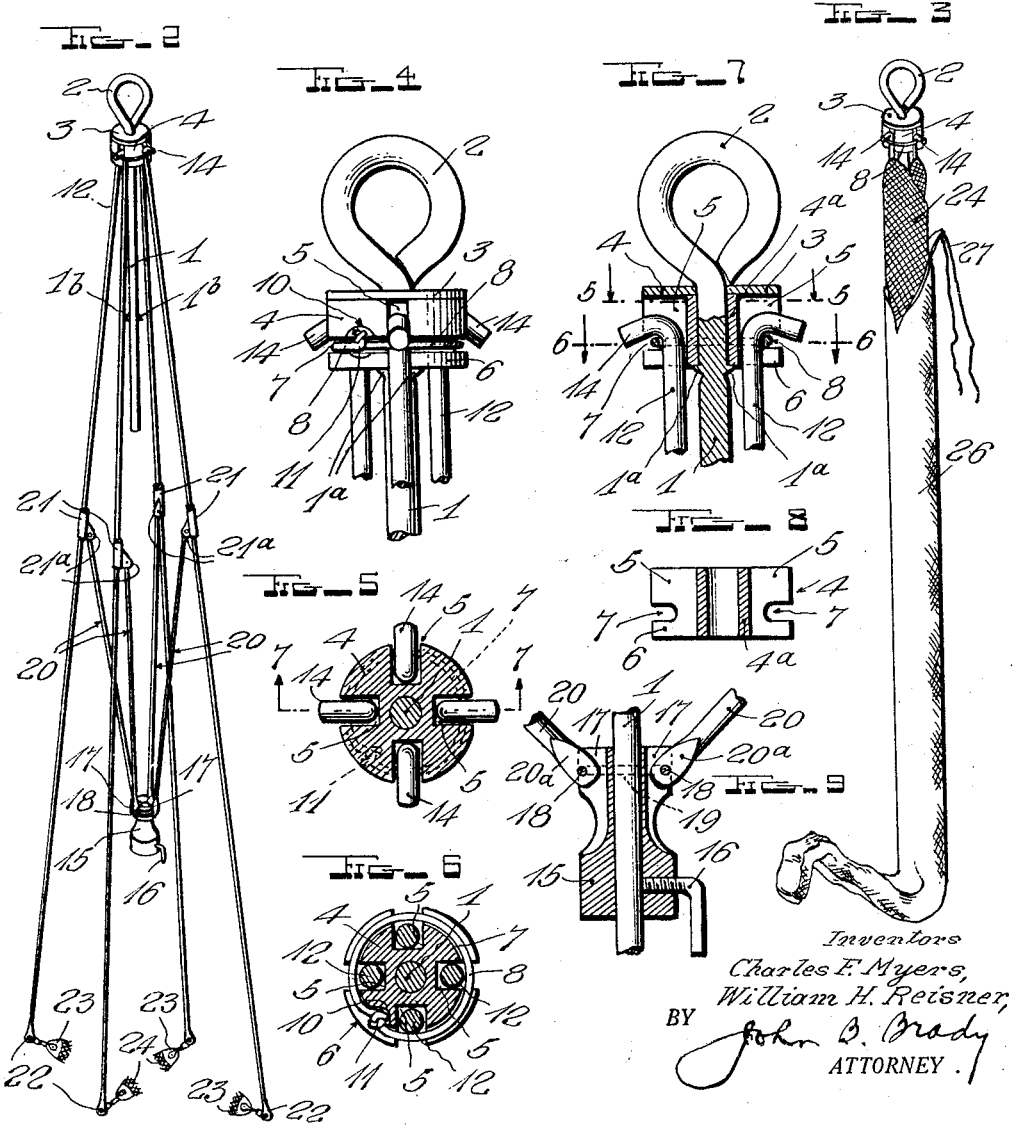

1,888,138

UNITED STATES PATENT OFFICE

CHARLES F. MYERS AND WILLIAM H. REISNER, OF HAGERSTOWN, MARYLAND, ASSIGNORS TO THE W. H. REISNER MANUFACTURING COMPANY, OF HAGERSTOWN, MARYLAND, A CORPORATION OF MARYLAND

LIVE BAIT TRAP NET

Application filed November 28, 1931. Serial No. 577,800.

Our invention relates broadly to live bait trap nets and more particularly to a frame construction for a live bait trap net.

One of the objects of our invention is to provide a simplified construction of live bait trap net and securing means therefor which is capable of manufacture inexpensively and on a quantity production basis.

Another object of our invention is to provide a frame construction and locking means for maintaining the frame in spread position when utilizing the net for entrapping fish or bait.

Still another object of our invention is to provide a simplified construction of hinge device for the frame members of a live bait trap in association with a simplified construction of locking means for supporting the frame members in spread position preparatory to the entrapping of fish or bait.

Other and further objects of our invention reside in the construction of hinge member for the frame members of a live bait trap net as set forth more fully in the specification hereinafter following by reference to the accompanying drawing, in which:

Figure 1 is a perspective view of the live bait trap net of our invention in spread operative position and about to be raised from the water; Fig. 2 is a perspective view showing the framework constituting part of the net in partially collapsed position; Fig. 3 is a similar view showing the net completely folded and an outer canvas casing about to be applied; Fig. 4 is a side elevation on the enlarged scale showing the upper rigidly fixed collar, and adjacent parts of the frame; Figs. 5 and 6 are detailed horizontal views taken on correspondingly numbered lines of Fig. 7; Fig. 7 is an enlarged sectional view taken through the upper end of the hinged connection for the frame members; Fig. 8 is a detailed vertical longitudinal sectional view through the stationary collar; and Fig. 9 is a sectional view through a cooperating lower and movable collar.

Referring to the drawing in detail, reference character 1 designates a central rod member having an eyelet 2 at the upper end thereof from which the live bait trap net is suspended from line 25. An annular member or metallic washer member 3 is slipped over the rod 1 and is seated against the eyelet 2. The annular member or metallic washer 3 is seated against the eyelet 2 at the upper extremity and is supported by means of cylindrical member 4 at its lower surface. The cylindrical member 4 has a central sleeve portion $4a$ which fits snugly around the rod 1 and is secured in position with respect thereto by means of the instruck portions $1a$ of the rod 1 by which the material of the rod 1 is upset immediately around the rod 1 forming a ledge upon which the cylindrical member 4 is supported. The cylindrical member 4 is provided with radially extending grooves 5 disposed in diametrically opposite positions. These slots are adapted to receive the ends of frame members 12 as shown. The frame members 12 are each provided with hook shaped end portions which are bent outwardly and which snugly fit into the radially extending grooves 5. The cylindrical member 4 has an annular groove 7 therein which divides the cylindrical member 4 into an upper cylindrical portion and a lower flange portion 6. A wire member 8 is passed around the concave sides of the hook shaped end portions 14 of frame members 12 and is secured at its ends as shown at 11. One side of the cylindrical member 4 is countersunk at 10 to accommodate the twisted ends 11 of the wire member 8 so that the wire member 8 and the twisted ends 11 thereof lie wholly within the surface of the cylindrical member 4. The frame members 12 are free to rock angularly in the groove 5, sufficient space between the angularly disposed hook shaped ends 14 and the washer 3 being allowed to permit swinging movement of the frame members 12. When the frame members 12 spread to a limiting position the hook shaped ends 14 rock or move angularly in the grooves 5. The metallic washer 3 serves as a limiting abutment for the hook shaped ends 14 when stresses tend to force the frame members 12 against the confining wire 8. The central rod 1 is upset at $1b$ intermediate the ends thereof for forming a limiting stop for the annular slidable member 15. The slidable member 15 is adjustable along rod 1 and is secured in position by set screw device 16. There are four radially extending grooves 17 in the slidable member 15, the upper portions of which are connected by an annular external groove 19.

The main frame members 12 for the live bait trap net each have intermediate supports connected thereto at 21 which supports are pivotally connected at 21a to the frame members 20. Frame members 20 are flattened at the ends 20a and are each pierced for the passage of a wire 18 therethrough, which wire is secured in annular groove 19 in slidable member 15 and serves as a securing means for the pivotal connection of frame members 20 to the slidable member 15. The frame members 20 when spread radially serve to stretch the main frame members 12 in such position that the net 24 which is connected to the ends of the main frame members 12 may be stretched laterally. The main frame members 12 are flattened at the ends 22 thereof and provide connections to the corners 23 of the net 24. When the net is in collapsed position as represented for example in Fig. 2 the adjustable member 15 is wholly removed from central rod 1. When the net is in stretched position the sleeve 15 is inserted over the rod 1 and abuts against the stop 1b on rod 1. The net may be collapsed to a small area and wrapped around the frame members 12 and then encased in a protective cover indicated at 26 in Fig. 3. A draw cord 27 is provided at the end of the casing 26 so that the net and frame may be entirely protected during transportation.

We have found the hinge and frame construction for the live bait trap net as set forth herein highly practical and while we have described our invention in a certain preferred embodiment, we desire that it be understood that modifications may be made and that no limitations upon our invention are intended other than are imposed by the scope of the appended claims.

What we claim as new and desire to secure by Letters Patent of the United States is as follows:

1. In a live bait trap net, a frame structure including a rod member, an eyelet formed on the end of the rod member, a cylindrical device carried by said rod member, radially extending grooves in said cylindrical device, an annularly extending groove on said cylindrical device, frame members for said net having hook shaped ends projecting into said radially extending grooves, and a wire member wound around the annularly extending groove and under the hook shaped ends of said frame members for securing said frame members in position free to angularly rock with respect to said central rod member.

2. In a live bait trap net, a frame structure, including a central supporting rod, a cylindrical sleeve member carried by said rod, a multiplicity of radially extending grooves, frame members having hook shaped ends projecting into said radially extending grooves, an annular groove extending laterally of said cylindrical sleeve member, and a wire member disposed in said annular groove for confining the hook shaped ends of said frame members within said radially extending grooves and free to rock therein with respect to said frame members.

3. In a live bait trap net, a central rod member, a cylindrical sleeve secured adjacent one end of said central rod member, said cylindrical sleeve having radially disposed grooves formed therein, frame members having hook shaped ends extending into said radially disposed grooves with the hook shaped portions having their concave sides directed toward the outside of said radially extending grooves, an annular groove extending laterally of said cylindrical member, a recess in one side of said cylindrical member adjacent the lateral annular groove, and a wire member wrapped around the lateral annular groove with the ends thereof united in said recess for confining the hook shaped ends in positions free to angularly rock to a position for supporting the net in spread relation.

4. In a live bait trap net, a central rod having an eyelet at the extremity thereof, a washer member carried by said rod and abutting against the eyelet end thereof, a cylindrical member secured on said rod in abutment against said washer, said cylindrical member having a plurality of radially extending grooves, frame members having hook shaped ends extending into said grooves, a laterally extending annular groove on said cylindrical member, a wire member extending around said groove and engaging beneath the hook shaped ends of said frame members, a sleeve adjustable along said rod, longitudinally extending grooves in said sleeves corresponding to the radially extending grooves in said cylindrical member, auxiliary frame members having their ends pivotally mounted in the longitudinally extending grooves in said sleeves and having their other ends pivotally connected with the aforementioned frame members, said sleeve being adjustable to selected positions along said central rod for moving said frame members to a position for spreading the net supported thereby, while angularly rocking the hook shaped ends of said first mentioned frame members in the grooves provided in said cylindrical member.

5. In a live bait trap net, a central rod member, a cylindrical device secured to one end of said rod, said cylindrical device having a plurality of radially disposed grooves therein, a laterally extending annular groove formed on the exterior of said cylindrical device, a multiplicity of frame members extending into said grooves, each of said frame members having a hook shaped end with the concave portion of the hook shaped end of each frame member facing outwardly in their respective grooves, a band member engaged beneath the hook shaped ends of said frame members and disposed within said laterally extending groove, and an adjustable sleeve shiftable along said rod member for selectively moving said frame members to different angular positions in said grooves.

In testimony whereof, we affix our signatures.

CHARLES F. MYERS.
WILLIAM H. REISNER.